UNITED STATES PATENT OFFICE.

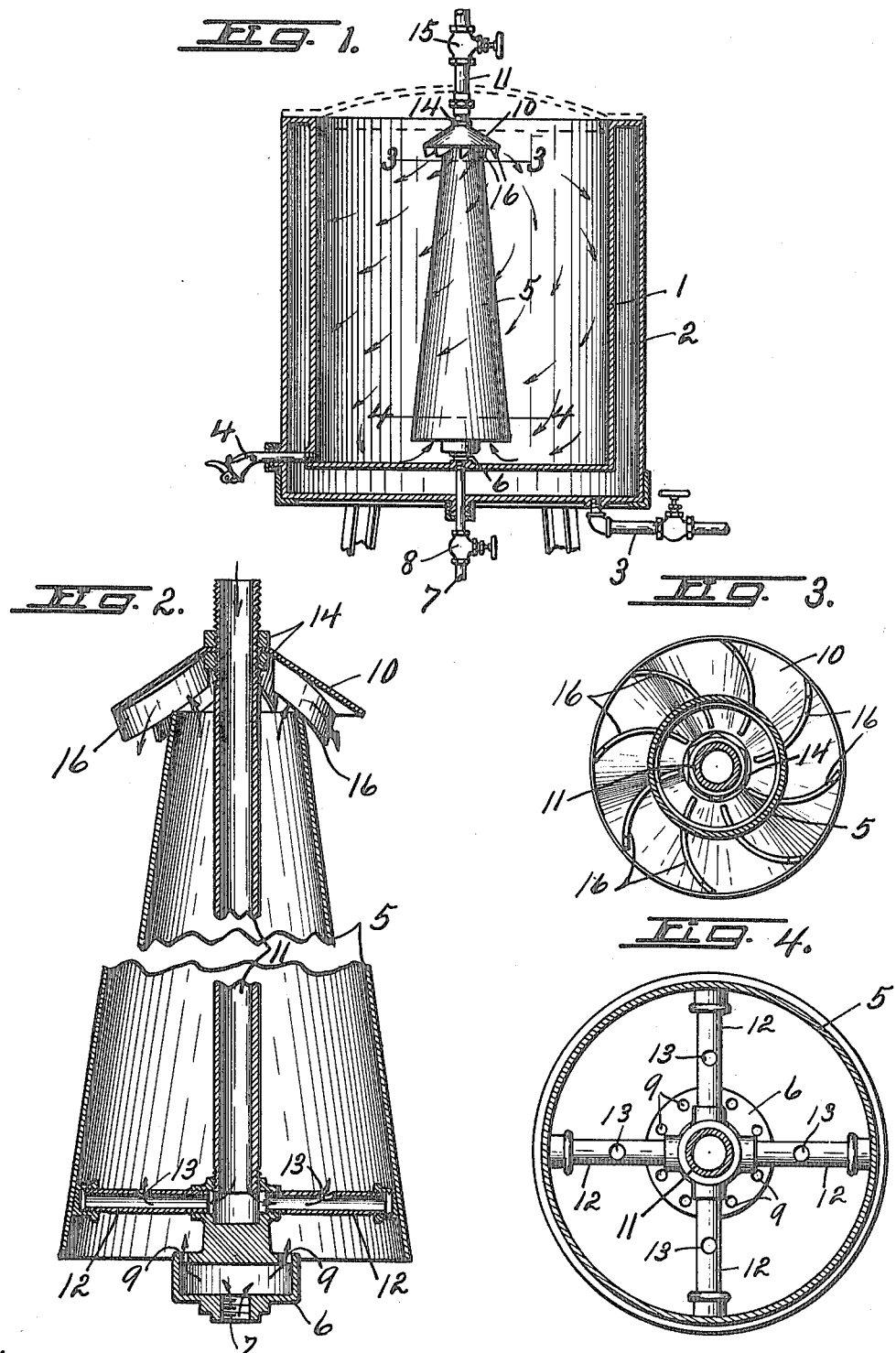

CHARLES A. TYLER, OF AUBURN, NEW YORK, ASSIGNOR TO NATIONAL CHEMICAL COMPANY, OF SYRACUSE, NEW YORK, A CORPORATION OF NEW YORK.

METHOD OF TREATING STARCH.

1,157,738.  Specification of Letters Patent.  Patented Oct. 26, 1915.

Application filed August 22, 1914. Serial No. 858,063.

*To all whom it may concern:*

Be it known that I, CHARLES A. TYLER, a citizen of the United States, and a resident of Auburn, in the county of Cayuga, in the State of New York, have invented new and useful Improvements in Methods of Treating Starch, of which the following, taken in connection with the accompanying drawings, is a full, clear, and exact description.

This invention relates to an improved method of preparing laundrying starch in large quantities as used more particularly in public laundries and similar places where laundry work is carried on extensively.

Heretofore, it has been the general custom in most public laundries to use the hot starch after it has been cooked or boiled but under these conditions, it is necessary to keep the starch at a substantially uniform temperature in order to obtain uniform results as to color, gloss and pliability without too much stiffness. Aside from the difficulty of maintaining this uniform temperature, this method of starching is attended with other disadvantages such as rapid deterioration and a consequent waste of the starch, difficulty in cleansing the starch containers and excessive heat under which the operator is required to work particularly in warm weather when the laundry business is at its height.

The main object therefore of my invention is to provide a simple and economical as well as sanitary method of producing cold starch of uniform consistency capable of imparting a uniform color to the articles to which it is applied without liability of deterioration or excess waste.

Another object is to avoid the unsanitary conditions and other disadvantages attending the use of the hot starch in that it eliminates the heat accompanying the use of hot starch and enables the starch containers to be more easily and thoroughly cleansed than would be the case in the use of the heated starch.

Another object is to render the operation of producing the cold starch substantially continuous and automatic.

A further object is to assure the production of cold starch of fine grain or uniform consistency without special attention on the part of the operator.

Other objects and uses will be brought out in the following descriptions.

In the drawings I have shown apparatus of this process in which—

Figure 1 is a vertical sectional view of the combined cooker, agitator, and cooler. Fig. 2 is an enlarged vertical sectional view, partly broken away, of the detached agitator and cooler. Fig. 3 is an enlarged inverted horizontal sectional view through the agitator and cooler taken on line 3—3, Fig. 1. Fig. 4 is a horizontal sectional view taken on line 4—4, Fig. 1.

In carrying out this process the raw starch is placed in a suitable tank or container —1— and surrounded by a steam jacket —2— to which steam is supplied from any available source through a pipe —3— for the purpose of heating and facilitating the cooking of the starch in the tank —1—, the latter being provided with an outlet —4— for drawing off the contents of the vat.

The invention, however, consists in introducing a heating agent as steam directly into the starch in such manner as to break up the entire body into finely divided particles thereby effecting a uniform and rapid cooking of the starch during which operation a relatively small amount of raw starch may be added to that in the vat to bring the entire body to the desired consistency whereupon the supply of heating fluid may be shut off and the body of the starch subjected to further agitation and cooling by means of a cooling agent as air under pressure. For this purpose a conical shell —5— is placed in an upright position centrally within the starch container —1— with its lower end supported on the bottom thereof by means of a hollow steam receiving chamber —6— which is connected to a steam supply pipe —7— extending through the bottom of the container —1— and jacket —2—, said pipe being provided with a valve —8— for cutting off the supply of steam when necessary.

The chamber —6— constitutes a steam distributing head in close proximity to the lower open end of the conical shell —5— and provided in its upper end with apertures —9— discharging directly into said shell.

The upper smaller end of the shell —1— extends to a point in proximity to the top of the starch container —1— and is open for the passage of steam therethrough which steam impinges against the under side of the superposed baffle cone —10— overhanging the upper end of the cone —5— in close proximity thereto but of greater diameter than the small end of the cone —5— so as to deflect the steam and any starch which may be carried thereby from the bottom to the top of the cone —5—, downwardly around the outside of the cone, it being understood that the lower end as well as the main body of the cone —5— is immersed in the starch in the vat —1—.

It is apparent from the foregoing description that as long as the valve —8— is open a continuous current of steam will pass into and through the cone —5— and starch which may be embraced within its circumference and that this current of steam will convey a part of the starch with it against the baffle cone —10— thus producing a continuous circulation of the starch through the cone and a thorough agitation of the starch in the vat for the purpose of breaking up such starch into fine particles and cooking the same in one operation, the cooking being effected by direct contact of the starch with the steam and also by contact of the starch with the heated walls of the cone —5— and vat —1—. While this cooking operation is in progress extra raw starch may be added to that in the vat to be cooked by the same process until the entire body is brought to the desired consistency.

When the cooking operation is completed and the starch brought to the desired consistency, the valve —8— is closed to shut off the supply of steam to the cone —5— and a similar valve in the pipe —3— is also closed to shut off the supply of steam to the jacket —2— whereupon the cooling agent as atmospheric air is introduced under pressure through the same cone —5— to further agitate and break up the mass of starch. To this end the cone —5— is provided with a centrally vertical tube —11— having its lower end secured to the head —6— but is cut off from communication with the distributing chamber in said head, the latter being provided with a plurality of, in this instance four, radial pipes —12— having their outer ends secured to the inner walls of the cone —5— near the lower end thereof and their intermediate portions provided with apertures —13— in their upper sides communicating with the interior of the main cone.

The pipe —11— extends through and some distance beyond the upper end of the cone —5— and forms a convenient support of the baffle cone —10— which is held in place by lock nuts —14—. The pipe —11— and its branches —12— serve to convey a cooling agent as atmospheric air under pressure into the interior of the cone —5— from the lower end thereof upwardly and for this purpose its upper end may be connected to any available source of air supply under pressure and is provided with a valve —15— which is normally closed during the cooking operation and is only open when the steam valve —8— is closed at the end of such operation to admit air through the pipe —11— and its branches —12— into the interior of the cone —5— whence it passes upwardly against the under side of the baffle cone —10— and is thereby deflected downwardly around the outside of the cone to agitate the starch and circulate it through the cone to further break it up into fine particles and to effect rapid cooling thereof.

In order that the starch may be agitated as much as possible the baffle cone —10— is provided on its under side with a series of veins or wings —16— curved in the same direction from the center toward the periphery to impart to the current of steam or air together with the starch a whirling motion with its vortex at the apexes of the cones.

When the entire body of starch is cooled uniformly to the desired temperature, the air valve —15— is closed thereby allowing the starch to assume a condition of rest ready for present or future use.

What I claim is:—

1. The herein described method of preparing laundrying starch consisting in cooking the raw starch to the desired consistency and then subjecting the cooked starch to the action of a cooling agent under pressure until the temperature of the entire body is reduced to a predetermined uniform degree.

2. The herein described method of preparing laundrying starch consisting in subjecting the raw starch to the action of a current of heating fluid of sufficient velocity and temperature to agitate and cook the starch and afterward subjecting the cooked starch to the action of a cooling agent under pressure sufficient to further agitate the entire body of starch.

3. The herein described method of preparing laundrying starch consisting in passing a current of steam through a confined body of raw starch under sufficient pressure and temperature to agitate and cook the entire body and afterward subjecting the cooked starch to action of a current of relatively cool air under sufficient pressure to further agitate the entire body and cool the same to a lower pre-determined temperature.

4. The herein described method of preparing laundrying starch consisting in subjecting a confined body of raw starch to the action of steam in such manner as to break such body into fine particles and to cook the same, supplying extra raw starch to such body during the agitating and cooking operation and finally introducing air under a relatively low temperature into the cooked starch in such a manner as to further agitate and cool the same.

5. The herein described method of preparing cold starch, consisting in projecting steam through the starch to agitate and cook the same, then projecting a current of relatively cool air under pressure through the cooked starch to agitate and cool the same.

In witness whereof I have hereunto set my hand this 18th day of August 1914.

CHARLES A. TYLER.

Witnesses:
E. A. THOMPSON,
VIOLA HOWLAND.